(12) United States Patent
Rustad et al.

(10) Patent No.: US 10,228,958 B1
(45) Date of Patent: Mar. 12, 2019

(54) SYSTEMS AND METHODS FOR ARCHIVING TIME-SERIES DATA DURING HIGH-DEMAND INTERVALS

(71) Applicant: Dell Software Inc., Aliso Viejo, CA (US)

(72) Inventors: Joseph Rustad, Toronto (CA); Robert A. Dickinson, Boulder, CO (US)

(73) Assignee: Quest Software Inc., Aliso Viejo, CA (US)

( * ) Notice: Subject to any disclaimer, the term of this patent is extended or adjusted under 35 U.S.C. 154(b) by 519 days.

(21) Appl. No.: 14/562,502

(22) Filed: Dec. 5, 2014

(51) Int. Cl.
  *G06F 9/455* (2018.01)
  *G06F 9/48* (2006.01)
  *G06F 17/30* (2006.01)

(52) U.S. Cl.
  CPC ........ *G06F 9/45533* (2013.01); *G06F 9/4831* (2013.01); *G06F 17/30545* (2013.01)

(58) Field of Classification Search
  CPC ................. G06F 9/45533–9/45558; G06F 2009/45562–2009/45595
  See application file for complete search history.

(56) References Cited

U.S. PATENT DOCUMENTS

| | | | | |
|---|---|---|---|---|
| 4,811,276 A * | 3/1989 | Suga | ...................... | G06F 9/4843 713/502 |
| 5,483,153 A | 1/1996 | Leeb et al. | | |
| 5,506,975 A * | 4/1996 | Onodera | ................. | G06F 15/17 710/260 |
| 6,223,202 B1 * | 4/2001 | Bayeh | ................... | G06F 9/5027 718/1 |
| 6,542,921 B1 * | 4/2003 | Sager | .................... | G06F 9/4831 712/228 |
| 7,296,267 B2 * | 11/2007 | Cota-Robles | ........... | G06F 9/505 702/179 |

(Continued)

OTHER PUBLICATIONS

Gu et al., An Empirical Study of High Availability in Stream Processing Systems, published by Springer-Verlag, pp. 1-9 (Year: 2009).*
Machida et al., Adaptive Monitoring for Virtual Machine Based Reconfigurable Enterprise Systems, published by IEEE, pp. 1-6 (Year: 2007).*

*Primary Examiner* — Thuy Dao
*Assistant Examiner* — Zheng Wei
(74) *Attorney, Agent, or Firm* — Winstead PC

(57) ABSTRACT

In one embodiment, a method includes continuously receiving time-series data for end-user transactions occurring on one or more monitored systems. The method further includes continuously processing and storing the time-series data in a plurality of virtual machines. In addition, the method includes, responsive to a determined time-series-data burst, spawning one or more temporary virtual machines. Moreover, the method includes, during the determined time-series-data burst, continuously processing and storing the time-series data in the plurality of virtual machines and in the one or more temporary virtual machines. The method also includes, responsive to a determined conclusion of the determined time-series-data burst, causing the one or more temporary virtual machines to transition to a passive state in which the one or more temporary virtual machines cease processing and storing new time-series data but make previously-stored time-series data available for access.

20 Claims, 5 Drawing Sheets

(56) References Cited

U.S. PATENT DOCUMENTS

| | | | |
|---|---|---|---|
| 7,356,817 B1* | 4/2008 | Cota-Robles | G06F 9/45537 710/262 |
| 7,647,591 B1* | 1/2010 | Loucks | G06F 9/4831 710/264 |
| 7,765,543 B1* | 7/2010 | Weissman | G06F 9/485 714/48 |
| 7,941,385 B2 | 5/2011 | Pabari et al. | |
| 7,979,245 B1 | 7/2011 | Bourlatchkov et al. | |
| 8,175,863 B1 | 5/2012 | Ostermeyer et al. | |
| 8,239,417 B2* | 8/2012 | Gu | G06F 17/30545 707/796 |
| 8,601,483 B2* | 12/2013 | He | G06F 9/45558 718/104 |
| 8,612,971 B1* | 12/2013 | Fitzgerald | G06F 9/45533 718/1 |
| 8,719,804 B2 | 5/2014 | Jain | |
| 8,726,337 B1* | 5/2014 | Curry | H04L 63/20 713/168 |
| 8,843,933 B1* | 9/2014 | Holler | G06F 9/45533 718/104 |
| 8,856,782 B2* | 10/2014 | Ghosh | G06F 9/45533 718/1 |
| 8,862,744 B2* | 10/2014 | Garg | 370/236 |
| 9,038,068 B2* | 5/2015 | Engle | G06F 9/5022 718/1 |
| 9,055,066 B2* | 6/2015 | Kim | H04L 65/4084 |
| 9,086,917 B1* | 7/2015 | Fitzgerald | |
| 9,098,324 B2* | 8/2015 | Li | G06F 9/4555 |
| 9,158,940 B1* | 10/2015 | Suit | G06F 21/78 |
| 9,218,207 B1* | 12/2015 | Neuse | G06F 9/5016 |
| 9,276,816 B1* | 3/2016 | Conte | H04L 41/12 |
| 9,317,536 B2* | 4/2016 | Sirer | G06F 17/30545 |
| 9,338,255 B1 | 5/2016 | Doe et al. | |
| 9,606,826 B2* | 3/2017 | Ghosh | G06F 9/45558 |
| 9,606,828 B2* | 3/2017 | Ghosh | G06F 9/45558 |
| 9,898,317 B2* | 2/2018 | Nakil | G06F 9/45558 |
| 2004/0128670 A1* | 7/2004 | Robinson | G06F 9/465 718/1 |
| 2004/0268347 A1* | 12/2004 | Knauerhase | G06F 9/45533 718/1 |
| 2005/0289540 A1* | 12/2005 | Nguyen | G06F 9/45558 718/1 |
| 2006/0225073 A1* | 10/2006 | Akagawa | G06F 9/52 718/1 |
| 2008/0010288 A1* | 1/2008 | Hinton | G06F 17/30545 |
| 2008/0276235 A1* | 11/2008 | Knauerhase | G06F 9/45533 718/1 |
| 2008/0295096 A1* | 11/2008 | Beaty | G06F 9/4856 718/1 |
| 2009/0106439 A1* | 4/2009 | Twitchell, Jr. | H04L 45/00 709/230 |
| 2009/0125902 A1* | 5/2009 | Ghosh | G06F 9/45533 718/1 |
| 2010/0023942 A1* | 1/2010 | Sheu | G06F 9/45558 718/1 |
| 2010/0162237 A1* | 6/2010 | Babu B R | G06Q 10/00 718/1 |
| 2010/0332643 A1* | 12/2010 | Benari | G06F 9/5077 709/224 |
| 2011/0019552 A1* | 1/2011 | Karaoguz | H04L 45/00 370/236 |
| 2011/0029970 A1* | 2/2011 | Arasaratnam | G06F 9/45558 718/1 |
| 2011/0126207 A1* | 5/2011 | Wipfel | H04L 9/3213 718/104 |
| 2011/0153697 A1* | 6/2011 | Nickolov | G06F 9/4856 707/827 |
| 2011/0167421 A1* | 7/2011 | Soundararajan | G06F 9/5077 718/1 |
| 2012/0072571 A1* | 3/2012 | Orzell | G06F 11/008 709/224 |
| 2012/0233315 A1 | 9/2012 | Hoffman et al. | |
| 2012/0246638 A1* | 9/2012 | He | G06F 9/45558 718/1 |
| 2013/0061220 A1* | 3/2013 | Gnanasambandam | G06F 9/45558 718/1 |
| 2013/0091183 A1* | 4/2013 | Edwards | G06F 3/0605 707/803 |
| 2013/0117567 A1* | 5/2013 | Chang | G06F 9/45558 713/170 |
| 2013/0139152 A1* | 5/2013 | Chang | G06F 9/45545 718/1 |
| 2013/0151835 A1* | 6/2013 | Fontignie | G06F 9/4416 713/2 |
| 2013/0185716 A1* | 7/2013 | Yin | G06F 9/45558 718/1 |
| 2013/0219391 A1* | 8/2013 | Lee | G06F 9/45533 718/1 |
| 2013/0227569 A1* | 8/2013 | Kohli | G06F 9/455 718/1 |
| 2013/0254383 A1* | 9/2013 | Wray | H04L 47/70 709/224 |
| 2013/0305245 A1* | 11/2013 | Doddavula | G06F 9/50 718/1 |
| 2013/0325906 A1* | 12/2013 | Qiu | G06F 17/303 707/803 |
| 2013/0332941 A1* | 12/2013 | Ramesh | G06F 9/4843 719/314 |
| 2014/0007088 A1* | 1/2014 | Jamjoom | G06F 9/45533 718/1 |
| 2014/0007094 A1* | 1/2014 | Jamjoom | G06F 9/45533 718/1 |
| 2014/0007097 A1* | 1/2014 | Chin | G06F 9/45533 718/1 |
| 2014/0040892 A1* | 2/2014 | Baset | G06F 9/455 718/1 |
| 2014/0047437 A1* | 2/2014 | Wu | G06F 11/3442 718/1 |
| 2014/0201343 A1* | 7/2014 | Keskkula | H04L 41/145 709/221 |
| 2014/0208319 A1* | 7/2014 | Yoshimura | G06F 21/53 718/1 |
| 2014/0359610 A1* | 12/2014 | Tian | G06F 9/45558 718/1 |
| 2014/0365680 A1* | 12/2014 | van Bemmel | H04L 29/06 709/232 |
| 2015/0052524 A1* | 2/2015 | Raghu | G06F 9/455 718/1 |
| 2015/0095910 A1* | 4/2015 | Ge | G06F 9/45533 718/1 |
| 2015/0128140 A1* | 5/2015 | Li | G06F 9/4555 718/1 |
| 2015/0178108 A1* | 6/2015 | Tarasuk-Levin | G06F 9/45558 718/1 |
| 2015/0178110 A1* | 6/2015 | Li | G06F 9/45558 718/1 |
| 2015/0355923 A1* | 12/2015 | Keller | G06F 9/45533 718/1 |
| 2015/0363216 A1* | 12/2015 | Sampathkumar | G06F 9/45558 718/1 |
| 2016/0055038 A1* | 2/2016 | Ghosh | G06F 9/45558 718/105 |
| 2016/0140063 A1* | 5/2016 | Moyer | G06F 9/4831 710/267 |
| 2017/0091221 A1* | 3/2017 | Yin | G06F 17/30179 |
| 2017/0104623 A1* | 4/2017 | Keskkula | H04L 41/082 |
| 2017/0116025 A1* | 4/2017 | Ghosh | G06F 9/45558 |
| 2017/0123837 A1* | 5/2017 | Ghosh | G06F 9/45558 |
| 2018/0046479 A1* | 2/2018 | Ghosh | G06F 9/45533 |

* cited by examiner

US 10,228,958 B1

SYSTEMS AND METHODS FOR ARCHIVING TIME-SERIES DATA DURING HIGH-DEMAND INTERVALS

BACKGROUND

Technical Field

The present disclosure relates generally to data storage and more particularly, but not by way of limitation, to systems and methods for archiving time-series data during high-demand intervals.

History of Related Art

The processing and storage demands for archival and indexing of large amounts of trace data can be highly variable depending on, for example, an amount of trace data coming in, user activity at monitored websites, etc. It is expensive in terms of computer resources to keep enough capacity running at all times to handle large-scale events.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes continuously receiving time-series data for end-user transactions occurring on one or more monitored systems. The method further includes continuously processing and storing the time-series data in a plurality of virtual machines. In addition, the method includes, responsive to a determined time-series-data burst, spawning one or more temporary virtual machines. Moreover, the method includes, during the determined time-series-data burst, continuously processing and storing the time-series data in the plurality of virtual machines and in the one or more temporary virtual machines. The method also includes, responsive to a determined conclusion of the determined time-series-data burst, causing the one or more temporary virtual machines to transition to a passive state in which the one or more temporary virtual machines cease processing and storing new time-series data but make previously-stored time-series data available for access.

In one embodiment, an information handling system includes at least one processor, wherein the at least one processor is operable to implement a method. The method includes continuously receiving time-series data for end-user transactions occurring on one or more monitored systems. The method further includes continuously processing and storing the time-series data in a plurality of virtual machines. In addition, the method includes, responsive to a determined time-series-data burst, spawning one or more temporary virtual machines. Moreover, the method includes, during the determined time-series-data burst, continuously processing and storing the time-series data in the plurality of virtual machines and in the one or more temporary virtual machines. The method also includes, responsive to a determined conclusion of the determined time-series-data burst, causing the one or more temporary virtual machines to transition to a passive state in which the one or more temporary virtual machines cease processing and storing new time-series data but make previously-stored time-series data available for access.

In one embodiment, a computer-program product includes a non-transitory computer-usable medium having computer-readable program code embodied therein. The computer-readable program code is adapted to be executed to implement a method. The method includes continuously receiving time-series data for end-user transactions occurring on one or more monitored systems. The method further includes continuously processing and storing the time-series data in a plurality of virtual machines. In addition, the method includes, responsive to a determined time-series-data burst, spawning one or more temporary virtual machines. Moreover, the method includes, during the determined time-series-data burst, continuously processing and storing the time-series data in the plurality of virtual machines and in the one or more temporary virtual machines. The method also includes, responsive to a determined conclusion of the determined time-series-data burst, causing the one or more temporary virtual machines to transition to a passive state in which the one or more temporary virtual machines cease processing and storing new time-series data but make previously-stored time-series data available for access.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
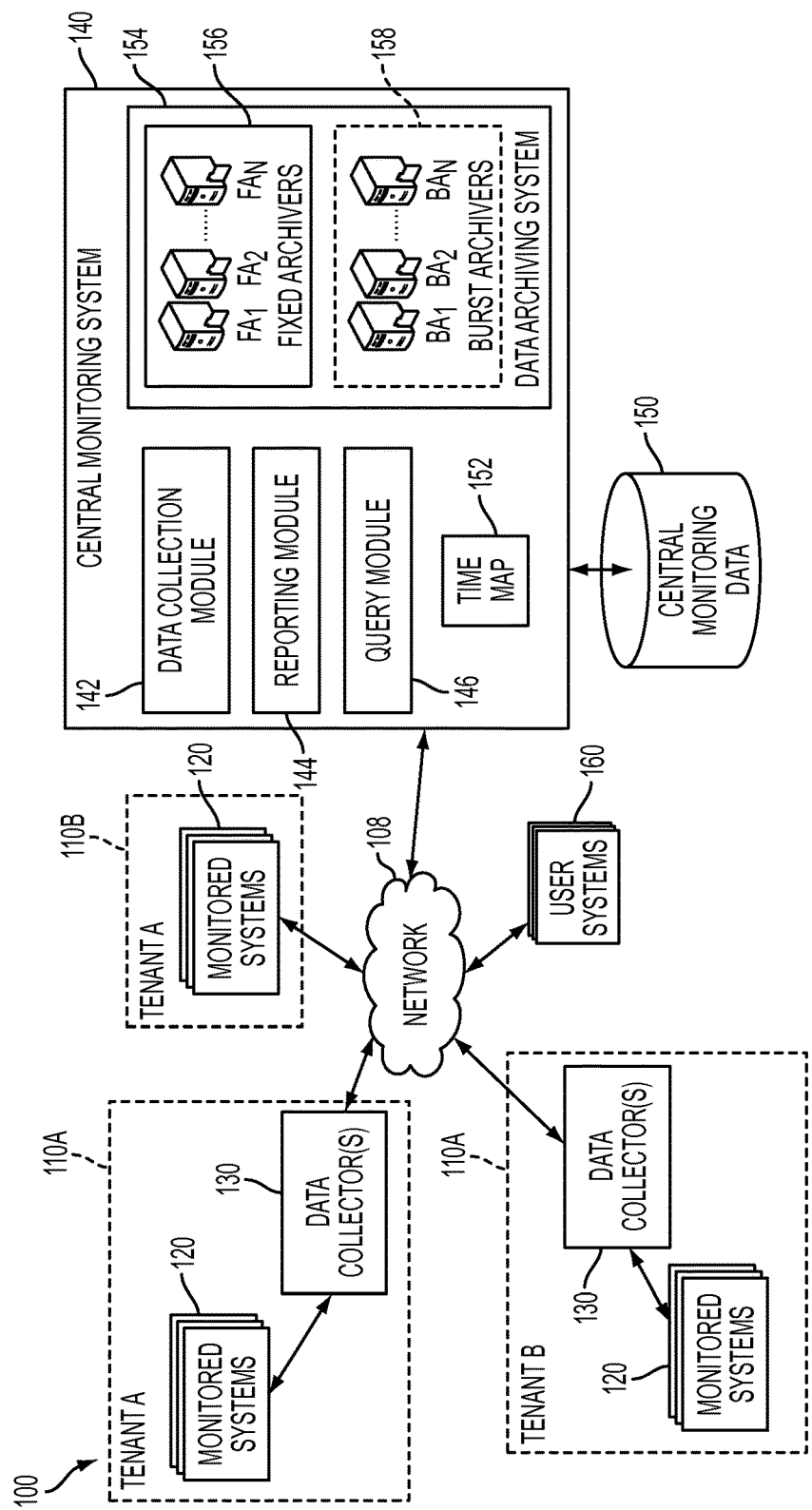
FIG. 1 illustrates an example computing environment.

In various embodiments, a performance-monitoring system can track and trace end-user (EU) transactions. The performance-monitoring system can produce and store, for example, time-series trace data for each EU transaction. An EU transaction, as used herein, is initiated by an EU request such as, for example, a web request, includes subsequent processing of the request by a backend-computing system, and is concluded by a web response from the backend-computing system. EU transactions can cross multiple nodes such as, for example, a web browser, a web server, an application server, a database, one or more external services, etc.

In general, time-series trace data for EU transactions, often referred to herein simply as "EU transaction data," can include numerous transaction properties or other identifiable characteristics of each EU transaction. For a given EU transaction, examples of transaction properties that can be included in time-series trace data include a particular web browser (e.g., MICROSOFT INTERNET EXPLORER, APPLE SAFARI, GOOGLE CHROME, MOZILLA FIREFOX, etc.), a particular transaction type (e.g., log-in, check-out, etc.), a geographic location (e.g., city, state, province, country, etc.), each method, function, or subroutine called during execution of the EU transaction, each database statement executed, a screen resolution or size, and/or the like. In general, each node of an end-to-end transaction path can also be a transaction property. It should be appreciated that some transaction characteristics such as a geographic location can include multiple layers of specificity such that each layer is a distinct transaction property. For example, for an EU transaction originating in Atlanta, Ga., Atlanta, Ga., and United States may be distinct transaction properties for the EU transaction. Other examples of transaction properties will be apparent to one skilled in the art after reviewing the present disclosure.

In various embodiments, transaction properties can result from any element of backend-performance data and/or EU-experience data. "Backend-performance data," in addition to having its ordinary meaning, can refer to data collected during runtime of a software application such as, for example, a web application, through instrumentation of the software application. "EU-experience data," in addition to having its ordinary meaning, can refer to data collected through observation of one or more transactions from an EU perspective. For example, in various embodiments, the EU perspective may be a node between a web server and an EU information handling system, a node between a web server and an application server, or the EU information handling system.

Time-series trace data can be stored through the use of archivers. In various embodiments, an archiver can be a combination of compute and storage resources on a virtual machine. Each archiver may be able to process time-series trace data for a certain load of EU transactions (e.g., three thousand EU transactions per second) and be able to internally store a certain amount of the time-series trace data (e.g., time-series trace data for approximately three million EU transactions in approximately one terabyte of storage). During high-demand intervals, or bursts, the load of EU transactions may exceed what the archivers can handle. Bursts can result from various sources such as, for example, holidays on which demand for certain web applications is unusually high (e.g., web shopping activity in the days leading up to and following so-called "Black Friday"). Bursts are generally periods of abnormally high quantities of EU transactions. Depending on the scenario, bursts may last a few hours, a day, and/or the like. In many cases, bursts may also arise unpredictably.

One way to accommodate bursts is to use a sufficient number of archivers such that most burst periods will be adequately handled. However, this approach can result in resource waste. More archivers than necessary may be utilized during non-burst periods. In addition, a greater number of archivers can add to the computational expense of querying. For example, the time-series trace data stored by the archivers may be periodically queried and retrieved for reports or on-demand data requests from administrators or other users. In such a scenario, distributed queries are typically executed across the archivers. If the archivers are far greater in number than necessary, the distributed queries may take far longer than necessary to execute since responses from all the archivers generally must be received and aggregated.

Another way to accommodate bursts is to separate processing and storage of the time-series data. According to this approach, compute and storage resources are scaled separately. Scaling may result in the addition of a compute node, which node can be shut down when it is no longer needed. Time-series trace data is typically transferred off the compute node before it is shut down. That is, the time-series data is typically summarized and centrally stored. According to this approach, however, data resolution and the ability generate reports based on the raw data is typically lost, potentially prematurely.

The present disclosure describes examples of creating and using burst archivers to provide additional data capture capacity for time-series trace data to serve peak demand, or bursts. Advantageously, in certain embodiments, the burst archivers can be maintained for a certain period of time after the peak ends and after the burst archivers stop archiving data, thereby keeping the trace data available in raw form, on the burst archivers. In addition, in certain embodiments, a query module or interface can maintain a time map indicative of when burst archivers were actively storing or archiving time-series trace data. Advantageously, in certain embodiments, the query module or interface can use the time map to only query a particular burst archiver if data is needed for a time period during which the particular burst archiver was actively archiving.

For purposes of this disclosure, an "information handling system" may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an example computing environment 100 for implementing burst archivers. In the computing environment 100, tenant systems 110 connect to the central monitoring system 140 over a network 108, which may be a private network, a public network, a local or wide area network, the Internet, combinations of the same, or the like. Each of the tenant systems 110 can represent an installation of physical and/or virtual computing infrastructure. In general, the tenant systems 110 can provide various types of data to the central monitoring system 140, including, for example, time-series trace data such as EU transaction data.

The tenant systems 110 shown can be owned or operated by the same or different entities. For example, two of the tenant systems 110 installed in separate locations are shown as owned or operated by "Tenant A," while another tenant system 110 is owned or operated by a different tenant, "Tenant B." Tenants A and B can represent customers (e.g., entities such as companies or individuals) of an operator of the central monitoring system 140. Although the term "tenant" is used herein to describe the systems 110 or owners/operators thereof, in addition to having its ordinary meaning, the term "tenant" can, but need not, refer to tenancy in a multitenant software architecture.

Each of the tenant systems 110 includes one or more monitored systems 120. The monitored systems 120 can include physical and/or virtual computing devices, such as physical machines and/or virtual machines. For instance, a monitored system 120 may include any of the following: a virtual machine, server, web server, application server, database, application, processor, memory, hard drive or other storage device, peripheral, software component, database tables, tablespaces in a database, application tiers, network switches or other network hardware, combinations of the same or the like. In particular, a monitored system 110 may include an application monitored from an EU perspective such that EU transactions are monitored. Any given tenant system 110 can include from one to several monitored systems 120. For example, a tenant system 110 can represent an entire data center having hundreds or even thousands of monitored systems 120.

Data collectors 130 can be provided in some or all of the tenant systems 110. In the depicted embodiment, data collectors 130 are shown in a pair of the tenant systems 110A, while no data collector 130 is provided in one of the tenant systems 110B. The data collectors 130 can be software and/or hardware agents, appliances, or the like that collect time-series trace data for EU transactions on the monitored systems 120. This time-series trace data can include any transaction property or other characteristic of EU transactions as described above. Additionally, the time-series trace data can include data resulting from correlating backend-performance data and EU-experience data as described in U.S. patent application Ser. No. 13/826,733 ("the '733 application"). Other examples of time-series trace data that can be collected and managed are described in U.S. Pat. No. 7,979,245 ("the '245 patent), U.S. Pat. No. 8,175,863 ("the '863 patent"), and U.S. Pat. No. 7,941,385 ("the '385 patent"). The '733 application, the '245 patent, the '863 patent, and the '385 patent are hereby incorporated by reference. In many cases, the data collectors 130 can collect this time-series trace data on a constant basis, for example, as many EU transactions (e.g., many thousands of EU transactions) occur each second.

Other tenant systems 110 that do not have local data collectors 130, such as the tenant system 110B, can provide time-series trace data directly to the central monitoring system 140. A data collection module 142 of the central monitoring system 140, for example, can access this data remotely by querying libraries or APIs of the tenant systems 110B or by directly collecting this data, thereby replacing the functionality of the data collectors 130 in some embodiments. More generally, in other embodiments, local data collectors 130 or other agents may be omitted, or each tenant system 110 can include one or more data collectors 130.

The data collectors 130, and/or in some cases the data collection module 142, can provide the collected time-series trace data to a data archiving system 154 of the central monitoring system 140. The data archiving system 154 can include one or more fixed archivers 156 and, at times, one or more burst archivers 158. The fixed archivers 156 can each be a combination of compute and storage resources on a virtual machine. In general, the fixed archivers 156 may exist persistently throughout all periods of activity (e.g., peak and non-peak demand intervals). The fixed archivers 156 may each be able to process, for example, x EU transactions per second (e.g., four thousand) and may have sufficient storage to store time-series trace data for y EU transactions (e.g., two million). During some periods (e.g., non-peak demand periods), there may be no burst archivers 158 online. For this reason, the burst archivers 158 are illustrated via dashed lines.

As described with respect to the fixed archivers 156, the burst archivers 158 can each be a combination of compute and storage resources on a virtual machine. Differently, however, the burst archivers 158 may be spawned, for example, by the data collection module 142, in response to an anticipated or detected burst. In that way, each of the burst archivers 158 may provide additional data capture capacity for a temporary period of time. In some cases, the temporary period of time may be pre-specified (e.g., two hours or one day). In other cases, the temporary period of time can be dynamic (e.g., until the burst is detected to have ended as a result of total EU transactions per second receding below a particular threshold). When the temporary period of time ends, the burst archivers 158 can remain online for a configurable period of time (e.g., two days or two weeks) so that raw time-series trace data maintained therein can be preserved for reports and data requests. The temporary period of time during which the burst archivers 158 actively capture time-series trace data may be referred to herein as an active state. The configurable period of time during which the burst archivers 158 remain online after a burst may be referred to herein as a passive state. Example states and transitions between states by the burst archivers 158 will be described in greater detail with respect to FIG. 2.

In an example, it may be anticipated or predicted that, on a particular day (e.g., "Black Friday"), an extra five archivers will be needed to process and store EU transaction data. According to this example, five burst archivers 158 could be spawned and given sufficient storage to store twenty-four hours of time-series trace data. After twenty-four hours, the five burst archivers 158 would transition to the passive state. While in the passive state, according to this example, no new time-series trace data would be routed to the five burst archivers 158. The configurable period of time during which the five burst archivers 158 remain in the passive state could be set, for example, to one week. When one week elapses, the five burst archivers 158 could be eviscerated.

A centralized data repository 150 can be maintained by the central monitoring system 140 for storing summarized data related to the time-series trace data archived by the fixed archivers 156 and the burst archivers 158. This is because, in a typical embodiment, the fixed archivers 156 and the burst archivers 158 maintain the time-series trace data in a raw form, for each EU transaction, which is expensive from a storage perspective. Therefore, each of the fixed archivers 156 and the burst archivers 158 may each maintain most recent EU transaction data (e.g., one day, one week, two weeks, etc.), which can be individually configurable. The summarized data may aggregate the time-series trace data in various ways such as, for example, by transaction type, by topology node (e.g., application server), and/or in the other suitable ways. In various cases, the time-series trace data may be summarized at regular intervals such as, for example, daily.

It should be appreciated that, in general, once the time-series trace data is summarized in a particular way, if corresponding raw data is no longer maintained on the fixed archivers 156 or the burst archivers 158, the ability to summarize it differently or run real-time reports that require higher data resolution may be lost. Advantageously, in certain embodiments, the burst archivers 158 can provide greater flexibility by expanding access to the time-series trace data in a configurable fashion for EU transaction data that results from peak periods during which scaling up is necessary. As a further advantage, in some embodiments, the simplicity of scaling up can be preserved as a result of combining compute and storage resources in the burst archivers 158.

In the depicted embodiment, the central monitoring system 140 includes the data collection module 142, a reporting module 144, and a query module 146. Each of these components can be implemented with hardware and/or software, including (optionally) virtual machines. In an example, the central monitoring system 140 can be implemented as a single management server. In another example, the central monitoring system 140 can be implemented in a plurality of virtual or physical servers, which may or may not be geographically co-located. For instance, the central monitoring system 140 and/or other aspects of the computing environment 100 may be hosted in a cloud-based hosting service such as the Azure™ service provided by Microsoft® or the EC2™ platform provided by Amazon®.

As described above, the data collection module 142 can, in some cases, collect EU transaction data directly from the monitored systems 120 (e.g., using web service calls or other remote procedure calls) for storage in the data archiving system 154. In addition, the data collection module 142 can enact burst-archiver changes in the data archiving system 154. Burst-archiver changes can include, for example, spawning one or more of the burst archivers 158, tearing down one or more of the burst archivers 158, and/or the like. In some embodiments, the burst-archiver changes can be enacted by the data archiving system 154 or self-implemented by the burst archivers 158. Further examples of burst-archiver changes will be provided with respect to FIG. 2.

The reporting module 144 can generate regular or on-demand reports related to the time-series trace data. In various cases, these reports can provide a real-time picture of some or all of the monitored systems 120. The reporting module 144 may also compute and store analytics or metrics related to the time-series trace data, for example, in the centralized data repository 150. The reporting module 144 typically accesses the time-series trace data via the query module 146. The reporting module 144 can publish reports or other generated information, for example, to a web page, dashboard, and/or the like.

The query module 146 can generate and execute a distributed query across the fixed archivers 156 and the burst archivers 158 for purposes of retrieving time-series trace data that is needed satisfy, for example, reports and requests. In certain embodiments, the query module 146 can efficiently scope the query using a time map 152. The time map 152 can be, for example, metadata, that identifies periods during which each of the burst archivers 158 was in an active state. In that way, the query module 146 can determine time periods for which time-series trace data is needed and exclude from the distributed query those of the burst archivers 158 that were not in the active state during those time periods. Example operation of the query module 146 will be described in greater detail with respect to FIG. 5.

The web page, user dashboard or other user interface(s) output, for example, by the reporting module 144, can be accessed by users of user systems 160. The query module 146 can also provide a user interface, for instance, that allows the users of the user systems 160 to obtain customized data related to any data maintained by the data archiving system 154 and/or the centralized data repository 150. The user systems 160 can include any type of computing device, including information handling systems such as desktops, laptops, tablets, smartphones, PDAs, to name a few. The user systems 160 can be operated by users associated with the tenants or by other users.

Figure 2:
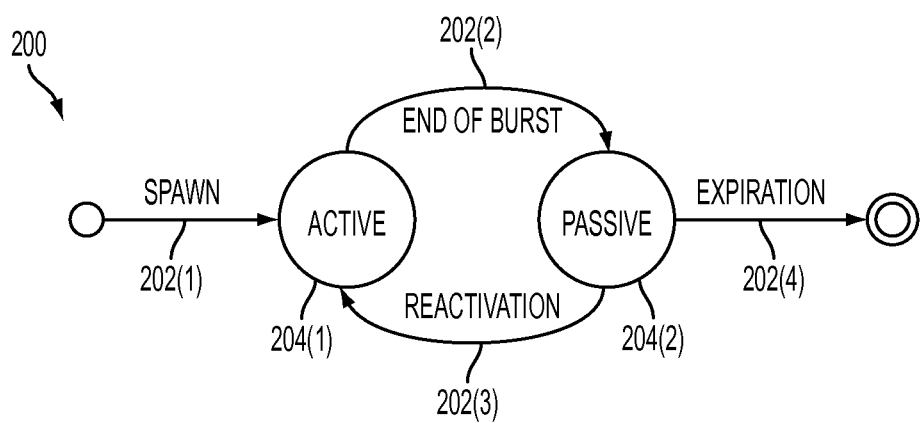
FIG. 2 illustrates an example state diagram.

FIG. 2 illustrates an example state diagram 200 for the burst archivers 158. Initially, the data collection module 142, the data archiving system 154, or another component initiates a spawn transition 202(1) to create a particular burst archiver. At that point, the particular burst archiver can exist in an active state 204(1). While in the active state 204(1), the particular burst archiver can archive time-series trace data for EU transactions in the fashion described with respect to FIG. 1.

When a burst ends, or at a scheduled time when the burst is anticipated to end, an end-of-burst transition 202(2) can be initiated. In various embodiments, the end-of-burst transition 202(2) can be initiated by the data archiving system 154, the data collection module 142, the particular burst archiver, or another suitable component. After the end-of-burst transition 202(2), the particular burst archiver is in a passive state 204(2). While in the passive state 204(2), the particular burst archiver does not typically capture and archive time-series trace data. However, the particular burst archiver remains online for a configurable period of time. In that way, time-series traces data previously processed and stored can be accessed, for example, by the query module 146.

In some embodiments, if another burst is detected or is anticipated to occur, the particular burst archiver can be reactivated via a reactivation transition 202(3). At that point, the particular burst archiver returns to the active state 204(1) and resumes processing and storing time-series trace data as described above. Otherwise, when the configurable period of time expires, the data collection module 142, the data archiving system 154, the particular burst archiver or another component can initiate an expiration transition 202(4). After the expiration transition 202(4), the particular burst archiver is torn down and is no longer online.

Figure 3:
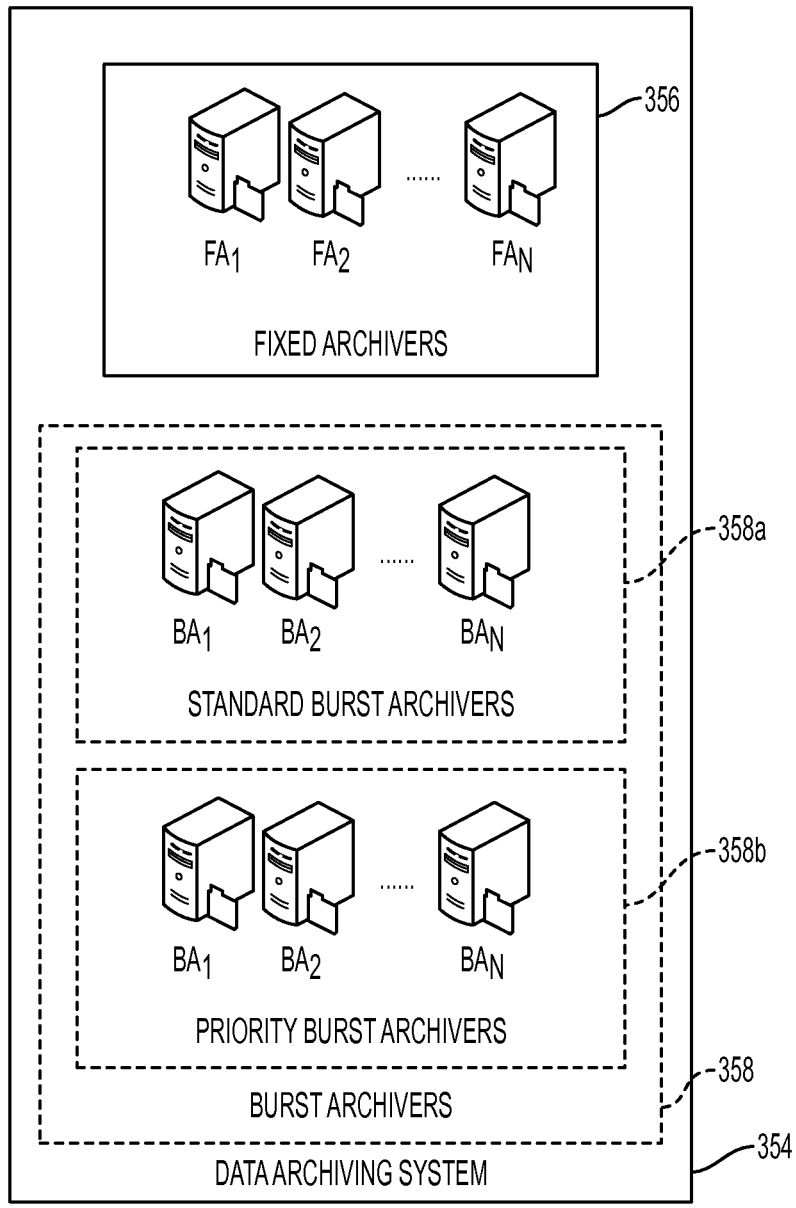
FIG. 3 illustrates an example data archiving system.

FIG. 3 illustrates an example data archiving system 354. In a typical embodiment, the data archiving system 354 can operate as described above with respect to the data archiving system 154 of FIG. 1. The data archiving system 354 includes fixed archivers 356 and burst archivers 358. More particularly, in the depicted embodiment, the burst archivers 358 are subdivided into standard burst archivers 358a and priority burst archivers 358b. In certain embodiments, the priority burst archivers 358b may be given greater storage capacity than the standard burst archivers 358a. In that way, selected tenants of the tenants 110, or particular customers, may have time-series trace data archived to the priority burst archivers 358b. In that way, greater access to data for the selected tenants can be achieved.

In various embodiments, similar principles can be applied to the fixed archivers 356. Also, in various embodiments, the burst archivers 358 and/or the fixed archivers 356 can be organized into tiers of progressively increasing storage capacity. Other variations will be apparent to one skilled in the art after reviewing the present disclosure.

Figure 4:
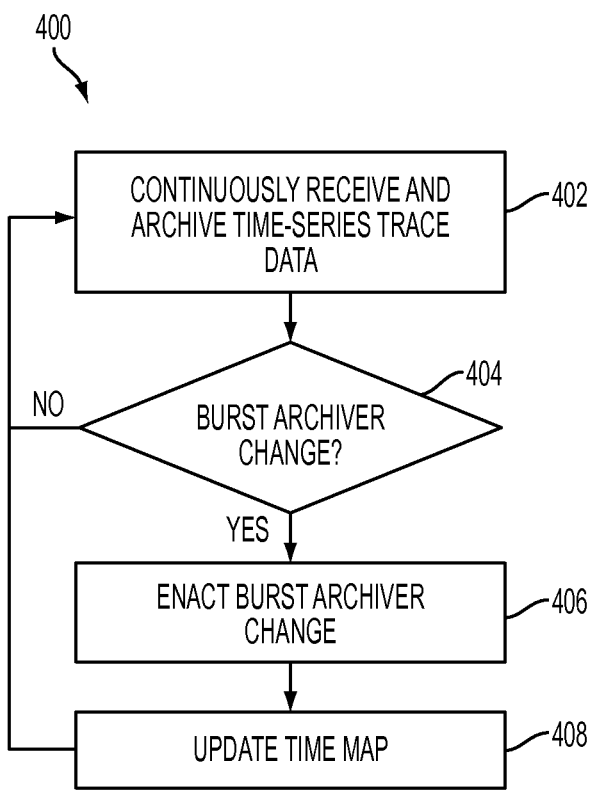
FIG. 4 illustrates an example of a process for managing burst archivers.

FIG. 4 illustrates an example of a process 400 for managing burst archivers. For example, the process 400, in whole or in part, can be implemented by one or more of the central monitoring system 140, the data collection module 142, the reporting module 144, the query module 146, the data archiving system 154, the burst archivers 158, the data archiving system 354, or the burst archivers 358. The process 400 can also be performed generally by the computing environment 100. Although any number of systems, in whole or in part, can implement the process 400, to simplify discussion, the process 400 will be described in relation to specific systems or subsystems of the computing environment 100.

At block 402, the data archiving system 154 continuously receives and archives time-series trace data for EU transactions. At decision block 404, the data collection module 142, the data archiving system 154 or another component determines whether a burst-archiver change should be enacted. A burst-archiver change can be, for example, any of the transitions described above with respect to FIG. 2. If it is determined at the decision block 404 that no burst-archiver change needs to be enacted, the process 400 returns to block 402 and proceeds as described above. Otherwise, if it is determined at the decision block 404 that a burst-archiver change should be enacted, the process 400 proceeds to block 406.

At block 406, the data collection module 142, the data archiving system 154 or another component enacts one or more burst-archiver changes. At block 408, the data collection module 142, the query module 146, the data archiving system 154 or another component updates the time map 152. In a typical embodiment, the time map 152 is updated to reflect changes to periods of activity of the burst archivers 158 as a result of the burst-archiver change. After block 408, the process 400 returns to block 402 and proceeds as described above. In various embodiments, the process 400 can execute indefinitely until terminated by a user, rule, or stop criteria is met.

Figure 5:
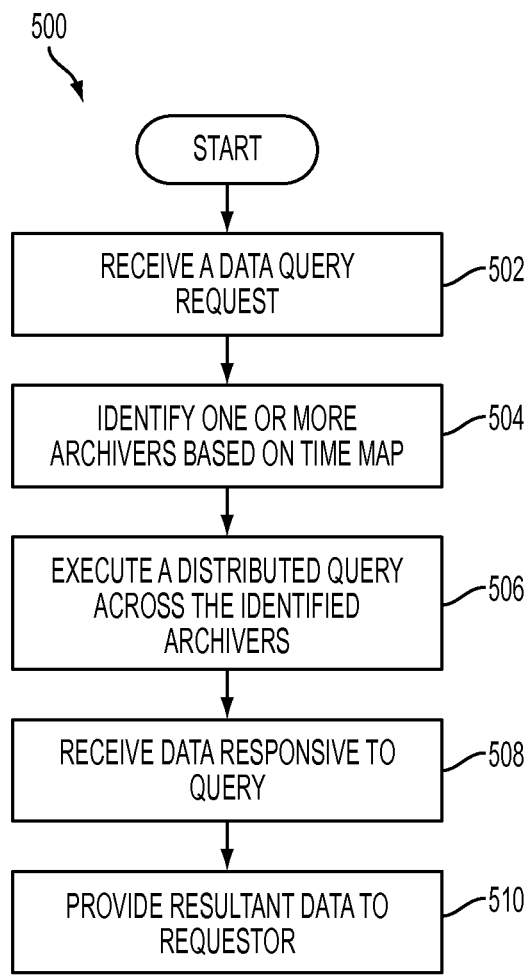
FIG. 5 illustrates an example of a process for querying a set of archivers.

FIG. 5 illustrates an example of a process 500 for querying a set of archivers. For example, the process 500, in whole or in part, can be implemented by one or more of the central monitoring system 140, the data collection module 142, the reporting module 144, the query module 146, the data archiving system 154, the burst archivers 158, the data archiving system 354, or the burst archivers 358. The process 500 can also be performed generally by the computing environment 100. Although any number of systems, in whole or in part, can implement the process 500, to simplify discussion, the process 500 will be described in relation to specific systems or subsystems of the computing environment 100.

At block 502, the query module 146 receives a data query request. In various cases, the data query request can be received from a user, the reporting module 144, another system or node in communication with the query module 146, and/or the like. The data query request can specify, for example, a search of time-series trace data stored in the data archiving system 154.

At block 504, the query module 146, based at least in part on the time map 152, identifies one or more archivers that may store time-series trace data responsive to the request. For example, according to the data query request, it may be that only time-series trace data within a certain defined period of time (e.g., the last six hours) is of interest. In such a case, the query module 146 can use the time map 152 to determine which of the burst archivers 158 were in the active state (e.g., the active state 204(1)) during the certain defined period of time. According to this example, the identified archivers can include the fixed archivers 156 and those of the burst archivers 158 that were in the active state for at least a portion of the defined period of time. Those of the burst archivers 158 that were not in the active state for any portion of the defined period of time can be excluded.

At block 506, the query module 146 executes a distributed query across the identified archivers in accordance with the data query request. At block 508, the query module 146 receives data from the identified archivers responsive to the distributed query. At block 510, the query module 146 provides resultant data to the requestor. As mentioned above, the requestor may be, for example, a user, the reporting module 144, another system or component, etc.

Advantageously, in certain embodiments, the use of the time map 152 to potentially exclude some of the burst archivers 158 from the distributed search can have significant performance benefits. For example, the computational expense of having the excluded burst archivers conduct a query or search can be saved. In addition, by way of further example, the query module 146 can save the computational and network expense of querying and waiting for responses from burst archivers that do not have responsive data.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system:
   continuously receiving time-series data for end-user transactions occurring on one or more monitored systems;
   continuously processing and storing the time-series data in a plurality of virtual machines;
   responsive to a determined time-series-data burst, spawning one or more temporary virtual machines;
   during the determined time-series-data burst, continuously processing and storing the time-series data in the plurality of virtual machines and in the one or more temporary virtual machines; and
   responsive to a determined conclusion of the determined time-series-data burst, causing the one or more temporary virtual machines to transition to a passive state in which the one or more temporary virtual machines cease processing and storing new time-series data but make previously-stored time-series data available for access.

2. The method of claim 1, comprising, responsive to an expiration of a configurable period of time after the determined conclusion, tearing down the one or more temporary virtual machines such that the previously-stored time-series data is no longer available for access.

3. The method of claim 1, comprising:
   responsive to a subsequent time-series-data burst while the one or more temporary virtual machines are in the passive state, reactivating the one or more temporary virtual machines; and wherein, once reactivated, the one or more temporary virtual machines resume processing and storing time-series data.

4. The method of claim 1, comprising, maintaining a time map indicative of one or more periods during which the one or more temporary virtual machines are processing and storing time-series data for end-user transactions.

5. The method of claim 4, comprising:
receiving a data query request;
identifying a set of virtual machines that potentially have responsive data based, at least in part, on the time map;
wherein the set of virtual machines is identified from among the plurality of virtual machines and the one or more temporary virtual machines;
executing a distributed query across the set of virtual machines; and
receiving data responsive to the distributed query from the set of virtual machines.

6. The method of claim 5, wherein the identifying comprises excluding any of the one or more temporary virtual machines that, as indicated by the time map, were not processing and storing time-series data during a time period specified by the data query request.

7. The method of claim 1, wherein:
the one or more temporary virtual machines comprise a set of one or more priority virtual machines and a set of one or more standard virtual machines; and
the priority virtual machines have greater storage capacity than the standard virtual machines.

8. The method of claim 7, comprising processing and storing time-series data for one or more selected tenants in the priority virtual machines.

9. The method of claim 1, wherein the one or more monitoring systems comprise a plurality of monitoring systems for a plurality of tenants.

10. The method of claim 1, comprising periodically summarizing the time-series data in a data store.

11. An information handling system comprising:
at least one hardware processor, wherein the processor is operable to implement a method comprising:
continuously receiving time-series data for end-user transactions occurring on one or more monitored systems;
continuously processing and storing the time-series data in a plurality of virtual machines;
responsive to a determined time-series-data burst, spawning one or more temporary virtual machines;
during the determined time-series-data burst, continuously processing and storing the time-series data in the plurality of virtual machines and in the one or more temporary virtual machines; and
responsive to a determined conclusion of the determined time-series-data burst, causing the one or more temporary virtual machines to transition to a passive state in which the one or more temporary virtual machines cease processing and storing new time-series data but make previously-stored time-series data available for access.

12. The information handling system of claim 11, the method comprising, responsive to an expiration of a configurable period of time after the determined conclusion, tearing down the one or more temporary virtual machines such that the previously-stored time-series data is no longer available for access.

13. The information handling system of claim 11, the method comprising:

responsive to a subsequent time-series-data burst while the one or more temporary virtual machines are in the passive state, reactivating the one or more temporary virtual machines; and
wherein, once reactivated, the one or more temporary virtual machines resume processing and storing time-series data.

14. The information handling system of claim 11, the method comprising maintaining a time map indicative of one or more periods during which the one or more temporary virtual machines are processing and storing time-series data for end-user transactions.

15. The information handling system of claim 14, the method comprising:
receiving a data query request;
identifying a set of virtual machines that potentially have responsive data based, at least in part, on the time map;
wherein the set of virtual machines is identified from among the plurality of virtual machines and the one or more temporary virtual machines;
executing a distributed query across the set of virtual machines; and
receiving data responsive to the distributed query from the set of virtual machines.

16. The information handling system of claim 15, wherein the identifying comprises excluding any of the one or more temporary virtual machines that, as indicated by the time map, were not processing and storing time-series data during a time period specified by the data query request.

17. The information handling system of claim 11, wherein:
the one or more temporary virtual machines comprise a set of one or more priority virtual machines and a set of one or more standard virtual machines; and
the priority virtual machines have greater storage capacity than the standard virtual machines.

18. The information handling system of claim 17, the method comprising processing and storing time-series data for one or more selected tenants in the priority virtual machines.

19. The information handling system of claim 11, the method comprising periodically summarizing the time-series data in a data store.

20. A computer-program product comprising a non-transitory computer-usable medium having computer-readable program code embodied therein, the computer-readable program code adapted to be executed to implement a method comprising:
continuously receiving time-series data for end-user transactions occurring on one or more monitored systems;
continuously processing and storing the time-series data in a plurality of virtual machines;
responsive to a determined time-series-data burst, spawning one or more temporary virtual machines;
during the determined time-series-data burst, continuously processing and storing the time-series data in the plurality of virtual machines and in the one or more temporary virtual machines; and
responsive to a determined conclusion of the determined time-series-data burst, causing the one or more temporary virtual machines to transition to a passive state in which the one or more temporary virtual machines cease processing and storing new time-series data but make previously-stored time-series data available for access.

* * * * *